(12) United States Patent
Peng et al.

(10) Patent No.: US 6,934,789 B2
(45) Date of Patent: Aug. 23, 2005

(54) INTERFACE, STRUCTURE AND METHOD FOR TRANSMITTING DATA OF PCI BUS WHICH USES BUS REQUEST SIGNAL FOR JUDGING WHETHER A DEVICE SUPPORTING DUAL TRANSMISSION MODE

(75) Inventors: Sheng-Chang Peng, Taipei (TW);
Chau-Chad Tsai, Taipei (TW);
Hsuan-Yi Wang, Yun Lin Hsien (TW);
Chi-Che Tsai, Kaohsiung Hsien (TW)

(73) Assignee: VIA Technologies, Inc., Taipei Hsien (TW)

( * ) Notice: Subject to any disclaimer, the term of this patent is extended or adjusted under 35 U.S.C. 154(b) by 496 days.

(21) Appl. No.: 09/894,684

(22) Filed: Jun. 27, 2001

(65) Prior Publication Data

US 2001/0034802 A1 Oct. 25, 2001

Related U.S. Application Data

(63) Continuation-in-part of application No. 09/447,724, filed on Nov. 24, 1999, now Pat. No. 6,463,490.
(60) Provisional application No. 60/215,565, filed on Jun. 30, 2000.

(30) Foreign Application Priority Data

Jun. 5, 2001 (TW) ........................................ 90113548 A

(51) Int. Cl.[7] ............................................. G06F 13/38
(52) U.S. Cl. ....................... 710/313; 710/314; 710/315; 710/309; 710/306; 710/107; 710/105; 710/60
(58) Field of Search .................................. 710/305–315, 710/105–107, 112–119, 58–61, 36–39, 14–16, 8, 316, 33–35, 29, 52, 104, 110

(56) References Cited

U.S. PATENT DOCUMENTS

| | | | | | |
|---|---|---|---|---|---|
| 5,220,561 | A | * | 6/1993 | Nuhn et al. ................... | 370/84 |
| 5,255,376 | A | * | 10/1993 | Frank .......................... | 710/60 |
| 5,727,171 | A | * | 3/1998 | Iachetta, Jr. ................ | 710/107 |
| 5,828,865 | A | * | 10/1998 | Bell ............................ | 710/60 |
| 5,937,173 | A | * | 8/1999 | Olarig et al. ............... | 710/308 |
| 6,137,849 | A | * | 10/2000 | Humphrey .................. | 375/354 |
| 6,185,642 | B1 | * | 2/2001 | Beukema et al. ............ | 710/60 |
| 6,393,548 | B1 | * | 5/2002 | Kerstein et al. ............. | 712/43 |
| 6,434,643 | B1 | * | 8/2002 | Ejiri ........................... | 710/58 |
| 6,453,373 | B1 | * | 9/2002 | Rodriguez et al. .......... | 710/58 |
| 6,484,222 | B1 | * | 11/2002 | Olson et al. ................ | 710/300 |
| 6,487,620 | B1 | * | 11/2002 | Grosshog et al. .......... | 710/107 |
| 6,581,129 | B1 | * | 6/2003 | Buckland et al. .......... | 710/306 |

* cited by examiner

*Primary Examiner*—Paul R. Myers
*Assistant Examiner*—Raymond N Phan
(74) *Attorney, Agent, or Firm*—J.C. Patents

(57) ABSTRACT

A bus data interface, structure and method for transmitting the data of a PCI bus is disclosed. The bus data interface comprises a high-bit transmitting buffer, a low-bit transmitting buffer, a multiplexer, a strobe generator, and a data distributor. The strobe generator utilizes the bus request signal and bus grant signal to transmit a data strobe signal in response to the PCI clock. According to the rising edge and falling edge of the data strobe signal, the data distributor retrieves data according to the data strobe signal. Further, the invention is compatible with the original PCI bus and allows the PCI bus to transmit data with a dual speed.

22 Claims, 6 Drawing Sheets

INTERFACE, STRUCTURE AND METHOD FOR TRANSMITTING DATA OF PCI BUS WHICH USES BUS REQUEST SIGNAL FOR JUDGING WHETHER A DEVICE SUPPORTING DUAL TRANSMISSION MODE

CROSS-REFERENCE TO RELATED APPLICATION

This application is a continuation-in-part of prior applications Ser. No. 09/447,724, filed Nov. 24, 1999 now U.S. Pat. No. 6,463,490. This application also claims the priority benefit of U.S.A. provisional application Ser. No. 60/215,565, filed on Jun. 30, 2000, and Taiwan application serial no. 90113548, filed on Jun. 5, 2001.

BACKGROUND OF THE INVENTION

1. Field of the Invention

The invention relates in general to a PCI bus compatible structure, and more particularly, to a PCI bus structure that supports multiple transmission speeds.

2. Description of the Related Art

FIG. 1 shows a structure using a PCI system in a normal computer. The central processing unit (CPU) 10 is coupled to the PCI bus 14 via the host bridge 12. The PCI bus 14 can be coupled to multiple masters 16a, 16b, 16c and 16d of PCI compatible peripherals. Each master can send a request signal (REQ) to require using the PCI bus 14. The arbiter in the host bridge 12 then sends the grant signal (GNT) to the master to grant the usage of the PCI bus 14.

The data transmission between the PCI compatible peripherals (such as the masters or the north bridge of the computer chip set) is controlled by the following interface control signals. The cycle frame signal FRAME# is asserted by an initiator (such as the masters or the north bridge) to confirm whether the transmission data is the last batch of data. When the cycle frame signal FRAME# is output, it indicates that the transaction of the data transmission via the PCI bus is started. As long as the cycle frame signal FRAME# remains in a low potential, the transaction of the data transmission continues. Meanwhile, the AD (data address signal) bus outputs a valid address during the address cycle and outputs a valid bus command during command/byte enable (CBE[3:0]) to indicate the data transaction type required by the initiator to a target. Right after all the valid addresses are output, the AD bus outputs the data to be transmitted, which is called the data cycle. Meanwhile, the byte enable signal of bus command after coding is output from the CBE line to transmit data. Cessation of output of the cycle frame signal FRAME# means the transaction status is transmitting the last batch of data, or the data transmission is complete. The initiator ready signal IRDY# and the target ready signal TRDY# are used to respectively indicate that the initiator and the target are ready to perform data transmission. In a read operation, the IRDY# signal means that the initiator is ready to receive data. When entering a write operation, the TRDY# signal indicates that the target is ready to receive data. The stop signal STOP# is used to indicate the target to request the initiator stopping the current transaction of data transmission.

However, during transmission, all the signals are transmitted according to the 33 MHz bus clock, and are triggered according to the rising edge of the clock. Thus, the data signal in one clock cycle can only transmit a set of data. Therefore, the data transmission speed is restricted by the bus clock and cannot cope with the requirements of high speed of data transmission.

SUMMARY OF THE INVENTION

The invention provides a bus data interface, structure and method to transmit data in a PCI bus. The pins of the bus request signal and bus grant signal are used to transmit a data strobe signal. The high potential and the low potential of the data strobe signal are used as a reference for transmission. Thus, the invention is compatible with the original PCI bus. A transmission operation having two times the original transmission clock is obtained to increase the overall data transmission speed.

The bus data interface to transmit the data of the PCI bus is applied to an apparatus compatible with the PCI bus. The PCI bus comprises at least a bus grant signal and a bus grant signal. The bus data interface comprises at least a high-bit transmitting buffer, a low-bit transmitting buffer, a multiplexer, a strobe generator and a data distributor.

The above high-bit transmitting buffer is used to receive and temporarily store high-bit transmitting data, while the low-bit transmitting buffer is used to receive and temporarily stores low-bit transmitting data. The multiplexer is coupled to the high-bit and the low-bit transmitting buffers to receive an internal bus clock signal of the bus data interface. When the internal bus clock signal is at a high potential, the multiplexer selects and outputs either the high-bit transmitting data or the low-bit transmitting data to the PCI bus. The multiplexer then selects and outputs the other of the high-bit transmitting data and the low-bit transmitting data to the PCI bus.

The strobe generator uses either the bus grant signal or the bus request signal to generate a data strobe signal. Correspondingly, the data distributor uses either the bus grant signal or the bus request signal to receive the data strobe signal. When the bus data interface outputs data to the PCI bus, the strobe generator outputs the data strobe signal in response to the internal bus clock signal. The data distributor coupled to the PCI bus receives data from the PCI bus according to the received data strobe signal, and transfers the high-bit and the low-bit data respectively.

In one embodiment, the bus data interface to transmit data on the PCI bus shows that when the bus master supporting the dual transmission mode is writing data, that is, outputting data to the PCI bus, the bus request signal pin is used as the data transmitting strobe signal pin. When the bus master is reading data, that is, the PCI bus is receiving data, the bus grant signal pin is used to as the data receiving strobe signal pin. When applying the bus data interface to a bus bridge that arbitrates the master control of the PCI bus according to the bus request and grant signals, and when the bus bridge is outputting data to the PCI bus, the bus grant signal pin is the strobe signal pin for data transmission. Similarly, the bus request pin is the strobe signal pin for data receiving when the bus bridge is receiving data from the PCI bus.

The invention provides another embodiment for the bus structure for transmitting data on the PCI bus. The bus grant signal pin and the bus request signal pin are used in the invention. The bus structure comprises at least a transmission compatible apparatus and reception compatible apparatus coupled to the PCI bus for data transmission thereon. The transmission compatible apparatus comprises at least a high-bit transmitting buffer, a low-bit transmitting buffer, a multiplexer, and a strobe generator. The reception compatible apparatus comprises at least a data distributor.

The high-bit transmitting buffer is used to receive and temporarily store a high-bit data. Similarly, the low-bit transmitting buffer is used to receive and temporarily store a low-bit data. The multiplexer is coupled to the high-bit and low-bit transmitting buffers to receive a first internal bus clock signal. When the first internal bus clock signal is at a high potential level, the multiplexer selects the output of either the high-bit or the low-bit transmitting buffer to output to the PCI bus. When the first internal bus clock signal is at a low potential level, the multiplexer selects the output of the other either the high-bit or the low-bit transmitting buffer to output to the PCI bus. When the transmission compatible apparatus outputs data to the PCI bus, the strobe generator generates the data strobe signal from either the bus grant signal pin or the bus request signal pin in response to the first internal bus clock signal. The data distributor of the reception compatible apparatus receives data from the PCI bus according to the data strobe signal, and outputs the received high-bit data and the received low-bit data, respectively.

In a further embodiment, when the transmission compatible apparatus is applied to the bus master and the reception compatible apparatus is applied to the bus bridge, the bus request signal pin transmits the data strobe signal when the bus master outputs data to the PCI bus. When the reception compatible apparatus is applied to the bus master and the transmission compatible apparatus is applied to the bus bridge, the bus grant signal pin is used to receive the data strobe signal when the bus masters receives data from the PCI bus. The above bus bridge arbitrates the master control of the PCI bus according to the bus request signal and the bus grant signal.

The invention uses data strobe signal transmitted from the bus request signal pin and the bus grant signal pin and the rising and descending edges of the data strobe signal as a reference for transmission. Thus, the original PCI bus is compatible, and the original PCI clock can be used as the strobe for an operation with a dual data transmission speed.

The invention also discloses a method for transmitting data on a PCI bus in a computer comprising a plurality of masters and a host bridge coupled to the PCI bus. The PCI bus comprises a plurality of bus request signals and a plurality of bus grant signals. BIOS detects whether the masters supports a dual transmission mode while starting up the computer. BIOS also compares the vendor's IDs and the device IDs of the masters with a status list to determine whether the masters support the dual transmission mode. The masters with the dual transmission mode assert the corresponding bus request signal to response the computer. Therefore, BIOS is capable of programming a host bridge in response to the masters supporting the dual transmission mode. When the dual transmission mode is required, a dual mode ID is asserted to activate the dual transmission mode. The host bridge grants the PCI bus to one of the masters supporting the dual transmission mode and a dual mode ID is asserted. If a range of a memory space supporting the dual transmission mode is accessed. perform the memory access at a dual speed, otherwise perform the memory access at a normal speed.

Both the foregoing general description and the following detailed description are exemplary and explanatory only and are not restrictive of the invention, as claimed.

DESCRIPTION OF THE PREFERRED EMBODIMENTS

The theory and method of the invention incorporate the major techniques disclosed in the Taiwanese patent application no. 88103699, with U.S. corresponding application Ser. No. 09/447,724. The mentioned application discloses the system and method of data transmission on the PCI bus, and the invention further discloses the implemented apparatus and bus structure thereof.

Figure 1:
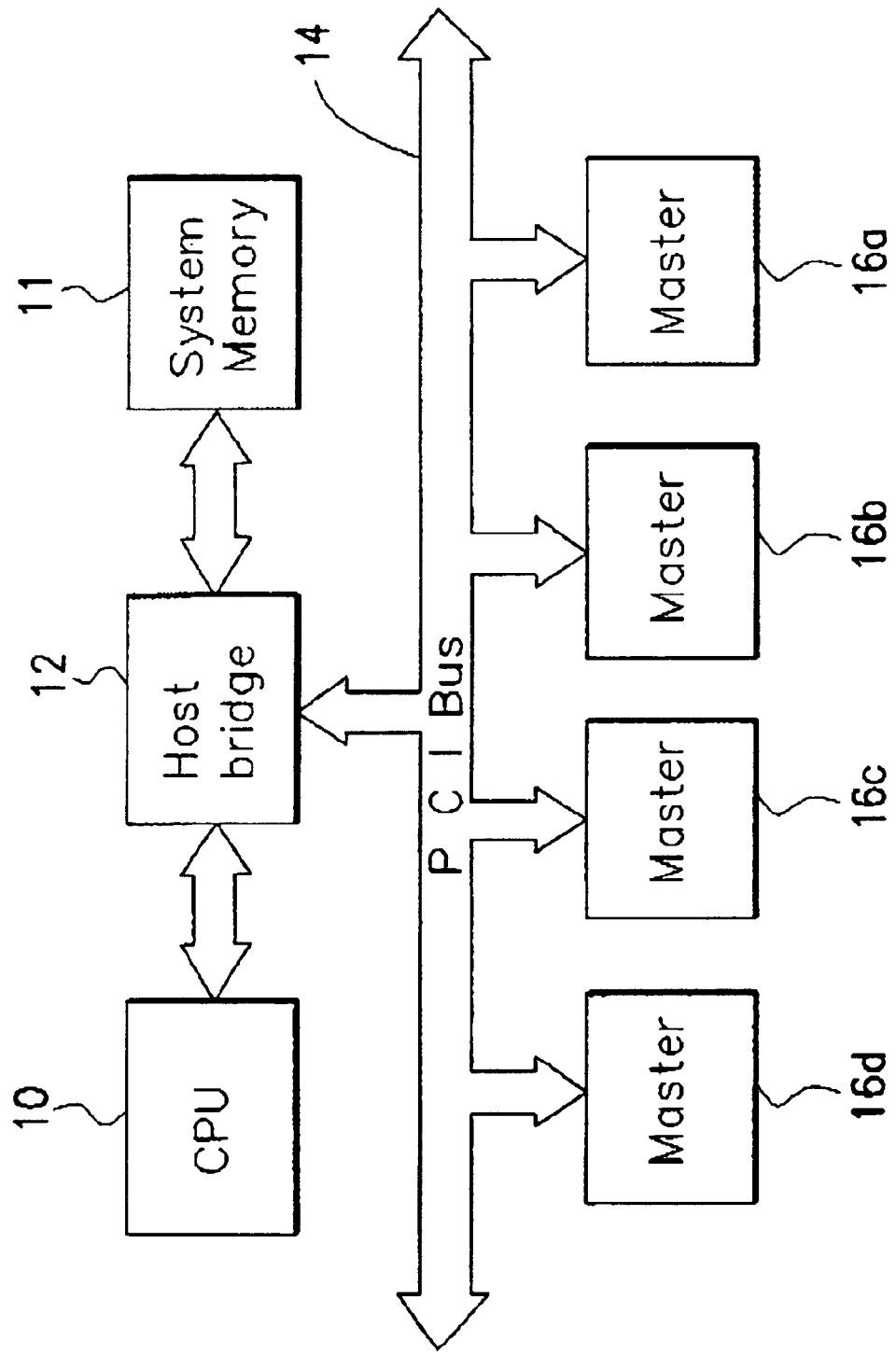
FIG. 1 is a block diagram showing a conventional PCI bus.
Figure 2:
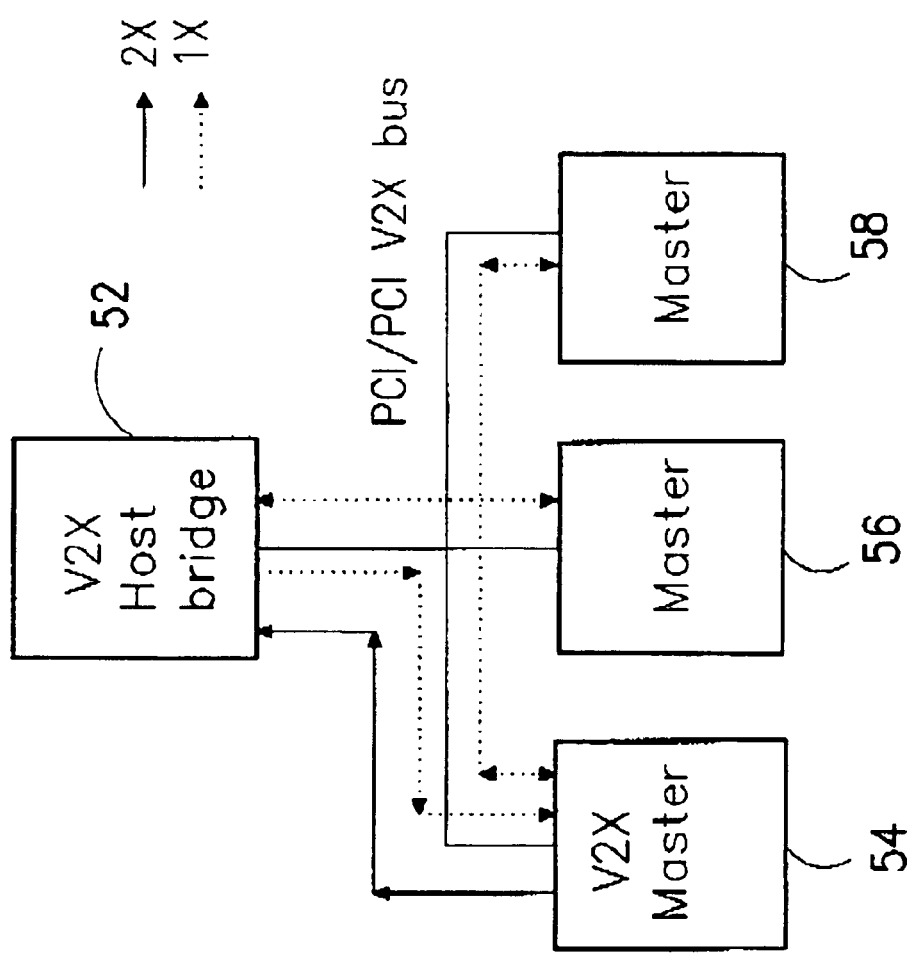
FIG. 2 is a block diagram showing a PCI bus structure that supports a dual data transmission speed according to one embodiment of the invention.

FIG. 2 illustrates a block diagram showing the transmission status of a PCI bus structure that supports a dual transmission mode. The embodiment includes a master 54 and a host bridge 52 with a dual transmission mode function, and masters 56/58 which are compatible with normal PCI structure. These apparatuses can be operated normally with the original PCI bus system.

In FIG. 2, only the PCI master 54 can support the dual transmission mode. In fact, the dual transmission mode is applied only when the master 54 and the host bridge 52 both with the dual transmission mode are performing write and read operations on AD bus. For others such as the masters 54/56/58 and the transmission between them, or the command output from the host bridge 52 and the transmission with the masters 54/56/58, the original PCI compatible control clock is used in data transmission to ensure the completeness of the data.

When the computer system is just booted, whether the host bridge 52 comprises a dual transmission function is detected. If yes, whether the master 54, the master 56 and the master 58 support the dual transmission mode is judged. For example, the BIOS of the system itemizes all the vendor IDs and the device IDs that can support dual transmission mode as a status list. The system compares whether the masters 54, 56 and 58 are one of the above to support the dual transmission mode. This is because the specification of the standard PCI bus does not have any special ID to support the dual transmission mode. Alternatively, a predetermined address of a configured space is queried. If any of the masters supports dual transmission mode, all the master(s) supporting the dual transmission mode enable their request signals (REQ). The request signal(s) of all the master(s) are reported to the system via the host bridge 52 to confirm the master(s) supporting the dual transmission mode in response to the request signal(s). The result is stored in the system. The BOIS, for example, programs the host bridge 52 according to the result, such that the host bridge 52 can distinguish which request/grant signal pair supports the dual transmission mode.

In this embodiment, as shown in FIG. 2, only the PCI master 54 can support the dual transmission mode. While the host bridge 52 grants the master 54 with the dual transmission mode and the host bridge 52 intends to operate in the dual transmission mode, the master 54 with the dual transmission mode asserts a plurality of distinguishable bytes at the AD bus. For example, the lowest two bits of the address signal[1:0] are configured as 2 to advise the host bridge 52 entering the dual transmission mode. When the host bridge 52 grants the master 54 with the dual transmission mode to use the bus, and receives the address signal of the bus command that has lowest two bits equal to 2, the host bridge 52 enters the dual transmission mode. The BIOS informs the master 54 with the dual transmission mode about an address range, such as in the system memory, that supports the dual transmission mode. When the transaction is within the address range that supports the dual transmission mode, the host bridge 52 and the master 54 are both allowed to enter the dual transmission mode. In addition, the lowest two bits of the address signals[1:0] can also be configured as a value 0, for example, other than 2, thus the bus transactions can be configured to perform in a normal mode.

Figure 3:
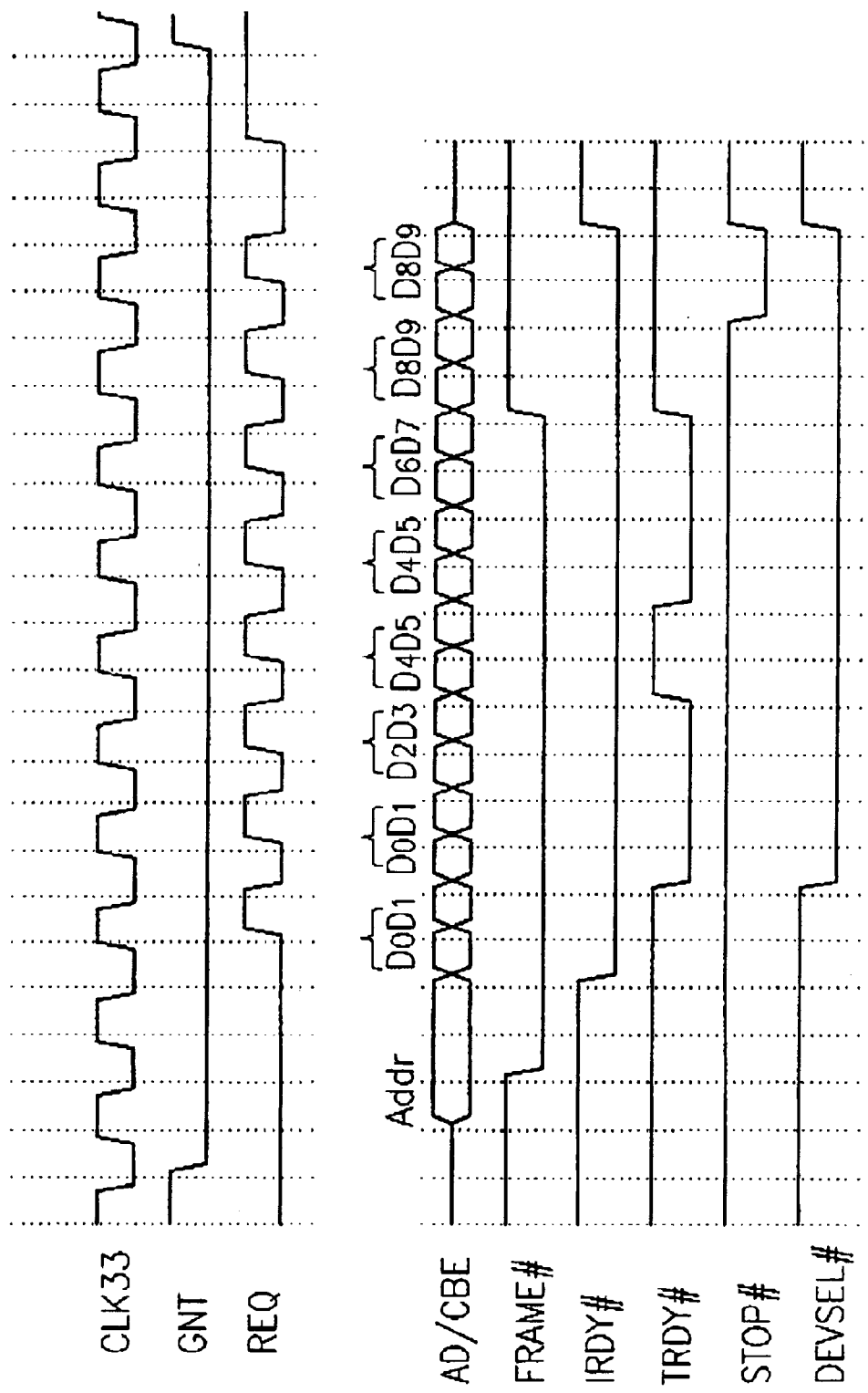
FIG. 3 shows the timing sequence of a PCI bus structure that supports a dual data transmission speed according to one embodiment of the invention.

In FIG. 3, a timing sequence of the PCI bus structure that supports the dual transmission mode according to the present invention is shown. When the PCI bus starts transmitting data on the AD bus (such as the data signals D0/D1/D2/D3/D4/D5/D6/D7/D8/D9), the transmission strobe signal the REQ signal, is used to latch the data. In the data cycle, the transmission of AD bus signals D0/D1 to the PCI bus is started. However, the ready signal TRDY# for the selected host bridge is not ready yet. Thus, the master 54 resends the data D0/D1. Accordingly, by generating proper wait states, the transmission of data D4/D5 and D8/D9 are transferred in a similar way.

The frame signal FRAME# deasserts at the last data D8/D9 to inform the selected host bridge that D8/D9 are the last data to be transmitted. In the second transmission of the data D8/D9, a stop signal STOP# is asserted to finish the transmission operation.

Figure 4:
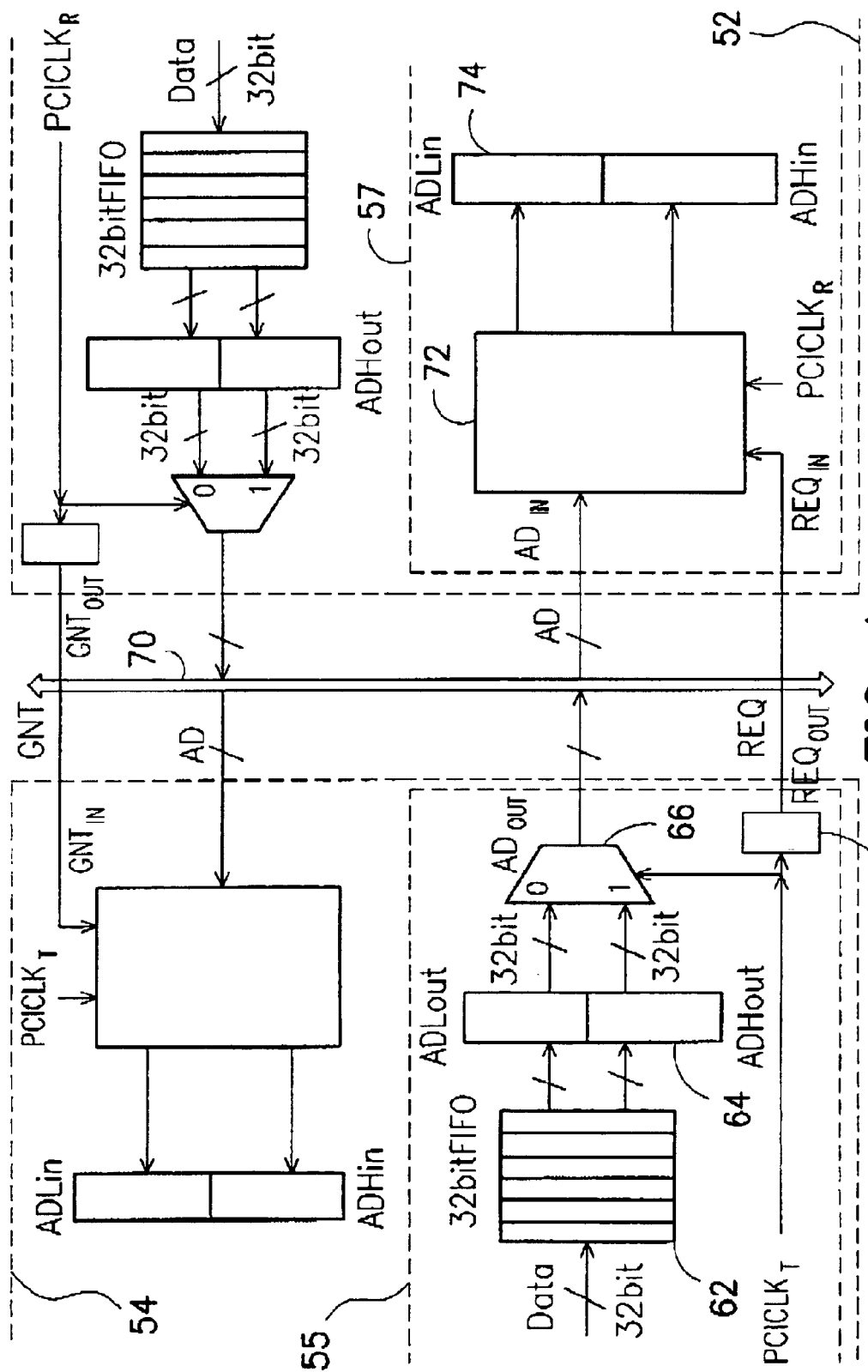
FIG. 4 is a block diagram showing the data distributor of a PCI bus compatible apparatus with a dual transmission mode according to one embodiment of the invention.

In FIG. 4, a block diagram of a PCI compatible apparatus with the dual transmission mode according to the present invention is illustrated. The PCI bus structure comprises a master 54 and a host bridge both having the dual transmission mode. Each of the master 54 and the host bridge 52 comprises a transmission compatible apparatus and a reception compatible apparatus which both support the dual transmission mode. The transmission compatible apparatuses and the reception compatible apparatuses are correspondingly coupled to each other via the PCI bus 70. For example, the transmission compatible apparatus 55 of the master 54 is correspondingly connected with the reception compatible apparatus 57 via the PCI bus 70 to write data into the memory (not shown) connected to the host bridge 52. Meanwhile, the bus request signal REQ is used to transmit the data strobe signal. Similarly, the transmission compatible apparatus (not indicated) of the host bridge 52 is correspondingly connected to the reception compatible apparatus (not indicated) of the master 54 via the PCI bus 70. When the master 54 receives the data from the PCI bus 70 to read the memory data via the host bridge 52, the bus grant signal GNT is asserted to receive the data strobe signal.

The first-in-first-out (FIFO) memory 62 is coupled to the high-bit transmitting buffer $ADH_{OUT}$ and the low-bit transmitting buffer $ADL_{OUT}$ to receive a plurality of transmission data. FIFO 62 transfers the high-bit and low-bit data to the high-bit and low-bit transmitting buffers $ADH_{OUT}$ and $ADL_{OUT}$, respectively. $ADL_{OUT}$ and $ADH_{OUT}$ of the data buffer pair 64 respectively receive the AD bus according to the transmission sequence of AD bus. The received data is then transmitted as the high-bit transmitting data and the low-bit transmitting data to the multiplexer 66. The multiplexer 66 transmits the AD data to the PCI bus 70 according to the high potential level and the low potential level (or the rising and falling edges) of the bus clock signal $PCICLK_T$.

The PCI bus 70 transmits the AD bus to the data distributor 72. Meanwhile, the bus clock signal $PCICLK_T$ is transmitted to the data distributor 72 by the strobe generator 68, which for example is a request signal apparatus 68 to utilize the REQ signal to generate the proper strobe signal according to the bus clock signal $PCICLK_T$. That is, the transmission pin of the REQ signal is used as the pin of the data strobe signal to transmit the data strobe signal with the same frequency as the bus clock signal. The same frequency of the data, the data strobe signal output from the transmission line of the strobe generator 68 is delayed while arriving the host bridge 52.

According to the data strobe signal coming from the strobe generator 68 and the received bus clock signal $PCICLK_R$, the data distributor 72 is capable of partitioning the received the AD bus signals. The data distributor 72 transmits the AD bus to the receiving low-bit buffer $ADL_{in}$ and the receiving high-bit buffer $ADH_{in}$ of the data buffer pair 74. The bus clock signal $PCICLK_R$ for the data distributor 72 is used to synchronize the received AD bus while transferring internally.

Figure 5:
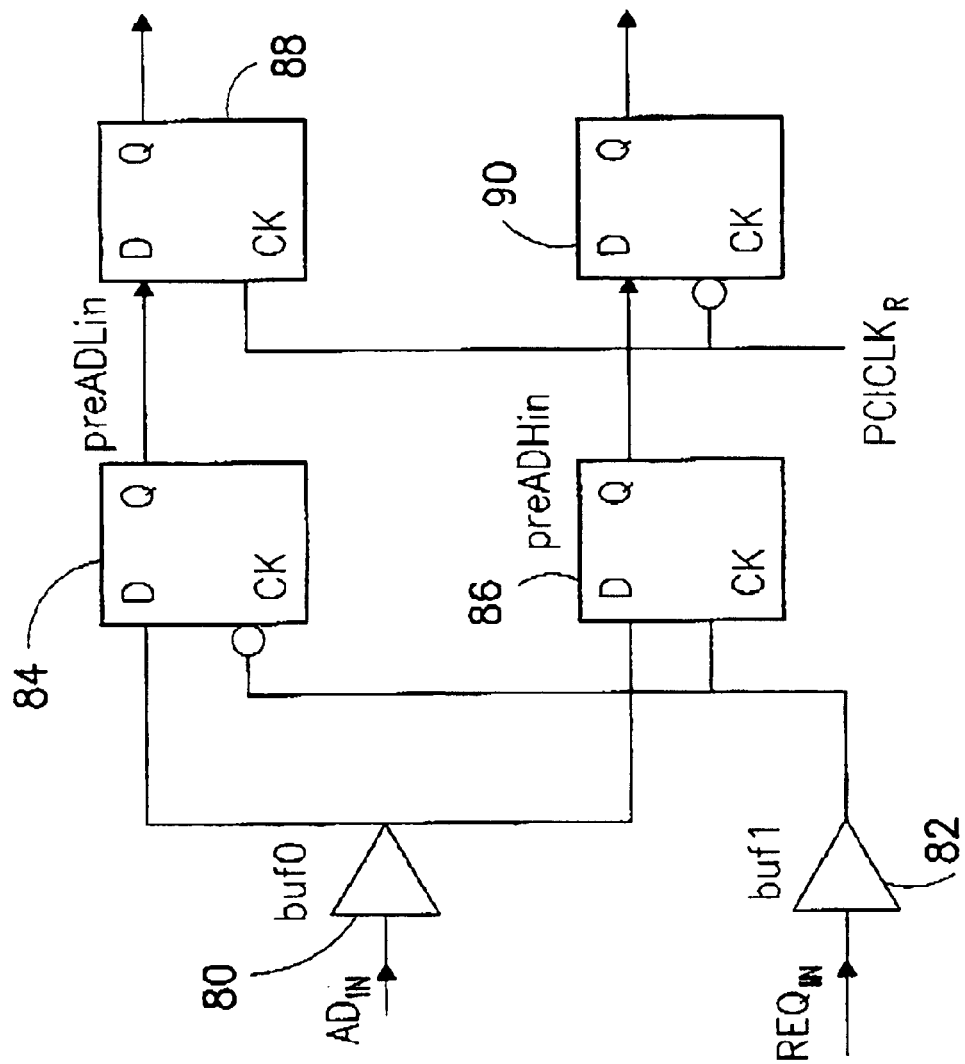
FIG. 5 shows an exemplary circuit for the data distributor in FIG. 4.

FIG. 5 shows a block diagram of the data distributor 72 of the PCI bus compatible apparatus with the dual transmission mode in FIG. 4. Referring to FIGS. 4 and 5, the AD bus signals received by the buffer 80 from the PCI bus 70 is output to an output controller 84/86. The output controllers 84 and 86 are also called the trigger latch 86 and the negative enable latch 84, wherein a D-type flip-flop is used as the output controller in this embodiment as an example. Each of the output controllers 84 and 86 comprises a data input terminal, a trigger terminal and a data output terminal. The data input terminal is coupled to the output of the data buffer 80. The trigger terminal is coupled to the output of the strobe signal buffer 82 to latch the high-bit data, indicated as pre $ADH_{in}$, and the low-bit data, indicated as pre $ADL_{in}$, according to the received data strobe signal, which is the REQ signal in this embodiment.

The data input terminal of the trigger latch 88 is coupled to the data output terminal of the negative enable latch 84. The trigger terminal is coupled to the internal bus clock signal $PCICLK_R$ to cause the data of the data input terminal output to the data output terminal, that is, output of the received low-bit data, to be synchronous to the internal bus clock signal $PCICLK_R$. Similarly, the data input terminal of the negative enable latch 90 is coupled to the data output terminal of the trigger latch 86. The trigger terminal of the negative enable latch 86 is coupled to the internal bus clock signal to cause the data of the data input terminal output at the data output terminal, that is, output of the received high-bit data, to be synchronous to the internal bus clock signal $PCICLK_R$. That is, the latches 88/90 output the pre $ADL_{in}$ and pre $ADH_{in}$ signals according to the bus clock signal $PCICLK_R$, so as to transfer the data to the $ADL_{in}$ and $ADH_{in}$ of the data buffer pair 74 respectively.

In FIG. 5, the data input terminal of the trigger latch 88 is coupled to the data output terminal of the negative enable latch 84, while the data input terminal of the negative enable latch 90 is coupled to the data output terminal of the trigger latch 86. Two sets of latches are used so as to synchronize the data with the internal bus clock signal $PCICLK_R$. Therefore, one can also couple the data input terminal of the negative enable latch 90 to the data output terminal of the negative enable latch 84, and the data input terminal of the trigger latch 88 to the data output terminal of the trigger latch 86.

Figure 6:
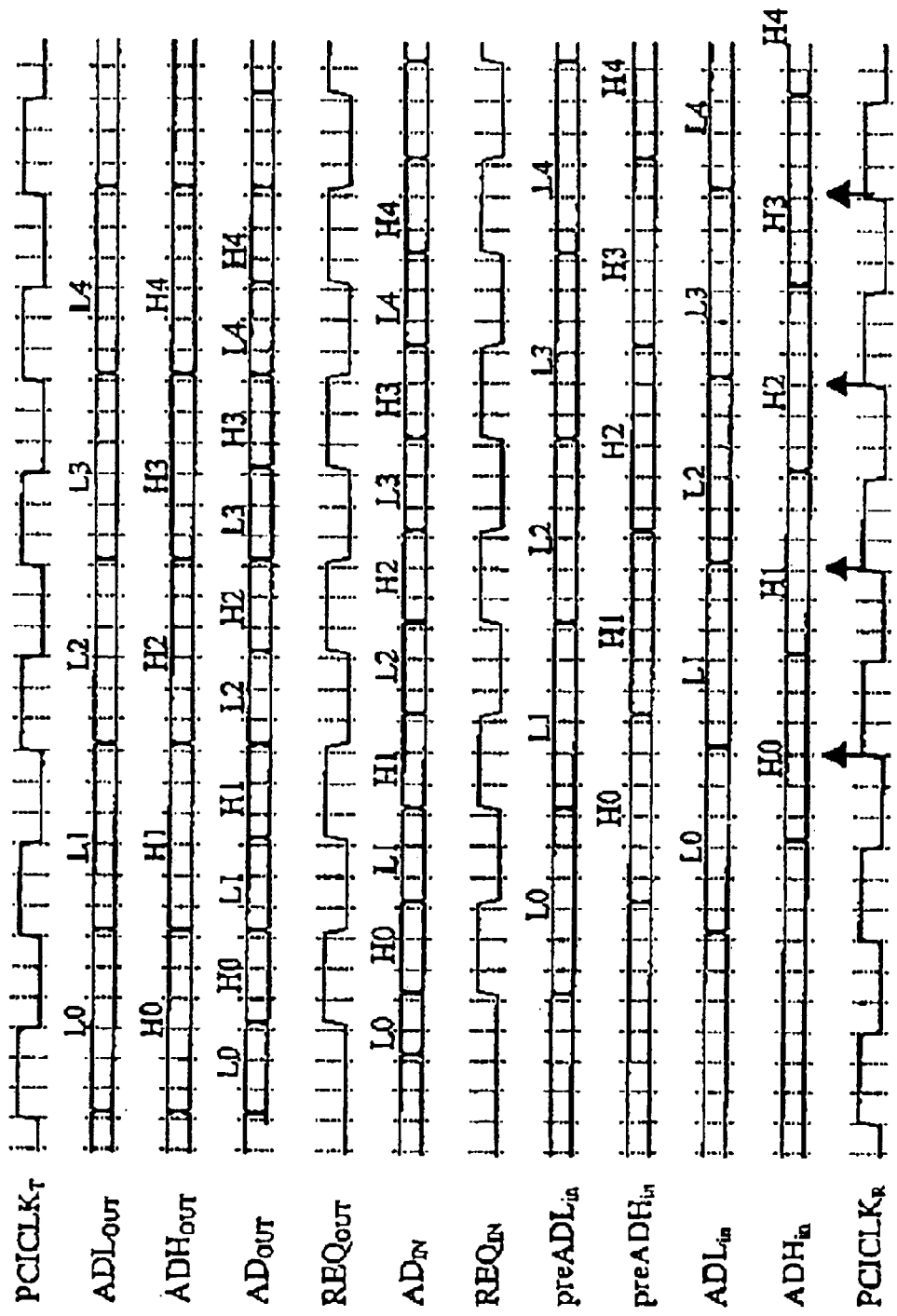
FIG. 6 shows the timing sequence of the PCI bus compatible apparatus in FIG. 4 and FIG. 5.

FIG. 6 shows the timing sequence of the PCI compatible apparatus illustrated in FIGS. 4 and 5. Referring to FIGS. 6, 5 and 4, the AD bus signals L0 and H0, for example, are sequentially stored in the first-in-first-out memory 62, and respectively output to the ADL$_{OUT}$ and ADH$_{OUT}$ of the data buffer pair 64 and the multiplexer 66.

The multiplexer 66 sends the AD bus signals L0 and H0 to the PCI bus 70 according to the low and high potential levels of the bus clock signal PCICLK$_T$. Meanwhile, via the strobe generator 68, the signal PCICLK$_T$ outputs the data strobe signal REQ$_{out}$ from the request signal pin REQ. Being delayed by the PCI bus 70, the PCICLK$_T$ is further sent to the data distributor 72 using the REQ$_{in}$. In FIG. 6, according to the data strobe signal, which is generated in response to the PCICLK$_T$ signal, and the bus clock signal PCICLK$_R$, the data distributor 72 outputs the AD bus signals L0 and H0 to the ADL$_{in}$ and ADH$_{in}$ of the data buffer pair 74, respectively. The PCICLK$_T$ signal includes the data strobe signal in this embodiment. The rest of the AD bus signals are transmitted in a similar way.

FIG. 6 and FIG. 5 discloses that the master 54 outputs data to the PCI bus by utilizing the bus request signal pin REQ transmitting the data strobe signal. Similarly, it can be inferred by people of ordinary skilled in the art, in view of the above disclosure, that applying the bus grant signal pin GNT receives the data strobe signal when the host bridge 52 is outputting data to the PCI bus, and the master 54 is receiving data on the PCI bus.

Other embodiments of the invention will appear to those skilled in the art from consideration of the specification and practice of the invention disclosed herein. It is intended that the specification and examples be considered as exemplary only, with a true scope and spirit of the invention being indicated by the following claims.

What is claimed is:

1. A bus data interface that transmitting data on a PCI bus, comprising:
   a high-bit transmitting buffer, to buffer a high-bit data;
   a low-bit transmitting buffer, to buffer a low-bit data;
   a multiplexer, coupled to the high-bit transmitting buffer and the low-bit transmitting buffer and receiving an internal bus clock, wherein the multiplexer alternatively outputs the high-bit transmitting data or the low-bit transmitting data to the PCI bus in response to a high potential level and a low potential level of the internal bus clock;
   a strobe generator, to generate a data strobe signal in response to the internal bus clock when the bus data interface outputs data to the PCI bus; and
   a data distributor, coupled to the PCI bus, for receiving the high-bit receiving data and the low-bit receiving data from the PCI bus in repines to the data strobe signal;
   wherein the strobe generator uses either a bus grant signal pin or a bus request signal pin as an output pin to transmit the data strobe signal.

2. The bus data interface according to claim 1, wherein the bus data interface is applied to a bus master, and when the bus master is performing a data write operation, the bus request signal pin transmits a transmitting data strobe signal; and when the bus master performing a data read operation, the bus grant signal pin receives a receiving data strobe signal.

3. The bus data interface according to claim 1, wherein the bus data interface is applied to a bus host bridge that arbitrates a master control of the PCI bus according to the bus request signal and the bus grant signal; when the bus host bridge is outputting data to the PCI bus, the bus grant signal pin transmit a transmitting data strobe signal; and when the bus host bridge is receiving data from the PCI bus, the bus request signal pin receive a receiving data strobe signal.

4. The bus data interface according to claim 1, further comprising a first-in-first-out memory coupled to the high-bit transmitting buffer and the low-bit transmitting buffer to receive a plurality of transmitting data into the high-bit buffer and low-bit transmitting buffer respectively.

5. The bus data interface according to claim 1, further comprising:
   a high-bit receiving buffer, coupled to the data distributor to buffer the high-bit receiving data; and
   a low-bit receiving buffer, coupled to the data distributor to buffer the low-bit receiving data.

6. The bus data interface according to claim 1, wherein the data distributor further comprises:
   a data buffer, coupled to the PCI bus to buffer the high-bit data and the low-bit receiving data;
   a strobe signal buffer, to buffer the data strobe signal;
   a first trigger latch, comprising a data input terminal, a trigger terminal and a data output terminal, wherein the data input terminal is coupled to an output of the data buffer and the trigger terminal is coupled to the strobe signal buffer to latch either the high-bit or the low-bit receiving data according to the receiving data strobe signal;
   a first negative enable latch, comprising a data input terminal, a trigger terminal and a data output terminal, wherein the data input terminal is coupled to the output of the data buffer and the trigger terminal is coupled to the strobe signal buffer to latch whichever of the high-bit and low-bit receiving data that are not yet latched according to the receiving data strobe signal;
   a second trigger latch, comprising a data input terminal, a trigger terminal and a data output terminal, wherein the data input terminal is coupled to the data output terminal of the first trigger latch, and the trigger terminal is coupled to the internal bus clock to output data of the data input terminal to the data output terminal synchronous to the internal bus clock; and
   a second negative enable latch, comprising a data input terminal, a trigger terminal and a data output terminal, wherein the data input terminal is coupled to the data output terminal of the first negative enable latch and the trigger terminal is coupled to the internal bus clock to output data of the data input terminal to the data output terminal synchronous to the internal bus clock.

7. The bus data interface according to claim 1, wherein the data distributor further comprises:
   a data buffer, coupled to the PCI bus to receive and output the high-bit and low-bit receiving data;
   a strobe signal buffer, to receive and output the receiving data strobe signal;
   a first trigger latch, comprising a data input terminal, a trigger terminal and a data output terminal, wherein the data input terminal is coupled to an output of the data buffer and the trigger terminal is coupled to the strobe signal buffer to latch either the high-bit or low-bit receiving data according to the receiving data strobe signal;
   a first negative enable latch, comprising a data input terminal, a trigger terminal and a data output terminal, wherein the data input terminal is coupled to the output of the data buffer and the trigger terminal is coupled to the strobe signal buffer to latch whichever of the high-bit and low-bit receiving data are not yet latched according to the receiving data strobe signal;
   a second trigger latch, comprising a data input terminal, a trigger terminal and a data output terminal, wherein the data input terminal is coupled the data output terminal of the first negative enable latch and the trigger terminal is coupled to the internal bus clock to output data of the data input terminal to the data output terminal synchronous to the internal bus clock; and a second negative enable latch, comprising a data input terminal, a trigger terminal and a data output terminal, wherein the data input terminal is coupled the data output terminal of the first trigger latch and the trigger terminal is coupled to the internal bus clock to output data of the data input terminal to the data output terminal synchronous to the internal bus clock.

8. A bus structure to transmit data on a PCI bus, wherein the PCI bus comprises a bus grant signal and a bus request signal, the bus structure comprising:

a transmission compatible apparatus, coupled to the PCI bus, further comprising:
  a high-bit transmitting buffer, to receive and temporarily store a high-bit transmitting data;
  a low-bit transmitting buffer, to receive and temporarily store a low-bit transmitting data;
  a multiplexer, coupled to the high-bit and low-bit transmitting buffers to receive a first internal bus clock signal, wherein the multiplexer alternatively outputs the high-bit transmitting data or the low-bit transmitting data to the PCI bus in response to a high potential level and a low potential level of the internal bus clock; and
  a strobe generator, for generating a data strobe signal according to the first internal bus clock signal when the transmission compatible apparatus is coupled to the PCI bus;

a reception compatible apparatus, coupled to the PCI bus and comprising:
  a data distributor, coupled to the PCI bus and receiving data from the PCI bus and outputting a high-bit receiving data and a low-bit receiving data in response to the data strobe signal.

9. The bus structure according to claim 8, wherein the transmission compatible apparatus is applied to a bus master, and the reception compatible apparatus is applied to a bus host bridge, wherein the bus host bridge arbitrates a master control of the PCI bus according to the bus request signal and the bus grant signal, and when the bus master is outputting data to the PCI bus, the bus request signal pin transmits the data strobe signal.

10. The bus structure according to claim 8, wherein the reception compatible apparatus is applied to a bus master and the transmission compatible apparatus is applied to a bus host bridge, wherein the bus host bridge arbitrates a master control of the PCI bus according to the bus request signal and the bus grant signal, and when the bus master is outputting data to the PCI bus, the bus grant signal pin receives the data strobe signal.

11. The bus structure according to claim 8, wherein the transmission compatible apparatus further comprises a first-in-first-out memory coupled to the high-bit transmitting buffer and the low-bit transmitting buffer to sequentially transmit the high-bit data and low-bit transmitting data to the high-bit and low-bit transmitting buffers, respectively.

12. The bus structure according to claim 8, wherein the reception compatible apparatus further comprises:
  a high-bit receiving buffer, coupled to the data distributor to buffer the high-bit receiving data; and
  a low-bit receiving buffer, coupled to the data distributor to buffer the low-bit receiving data.

13. The bus structure according to claim 8, wherein the data distributor further comprises:
  a data buffer, coupled to the PCI bus to receive and output the high-bit and low-bit receiving data;
  a strobe signal buffer, to receive and output the data strobe signal;
  a first trigger latch, comprising a data input terminal, a trigger terminal and a data output terminal, wherein the data input terminal is coupled to an output of the data buffer and the trigger terminal is coupled to the strobe signal buffer to latch either the high-bit or the low-bit receiving data according to the data strobe signal;
  a first negative enable latch, comprising a data input terminal, a trigger terminal and a data output terminal, wherein the data input terminal is coupled to the output of the data buffer and the trigger terminal is coupled to the strobe signal buffer to latch whichever of the high-bit and low-bit receiving data are not yet latched according to the data strobe signal;
  a second trigger latch, comprising a data input terminal, a trigger terminal and a data output terminal, wherein the data input terminal is coupled the data output terminal of the first trigger latch and trigger terminal is coupled to a second internal bus clock to output data of the data input terminal to the data output terminal synchronous to the internal bus clock; and
  a second negative enable latch, comprising a data input terminal, a trigger terminal and a data output terminal, wherein the data input terminal is coupled the data output terminal of the first negative enable latch and the trigger terminal is coupled to the second internal bus clock to output data of the data input terminal to the data output terminal synchronous to the second internal bus clock.

14. The bus data interface according to claim 8, wherein the data distributor further comprises:
  a data buffer, coupled to the PCI bus to receive and output the high-bit and low-bit receiving data;
  a strobe signal buffer, to receive and output the data strobe signal;
  a first trigger latch, comprising a data input terminal, a trigger terminal and a data output terminal, wherein the data input terminal is coupled to an output of the data buffer, and the trigger terminal is coupled to the strobe signal buffer to latch either the high-bit or the low-bit receiving data according to the data strobe signal;
  a first negative enable latch, comprising a data input terminal, a trigger terminal and a data output terminal, wherein the data input terminal is coupled to the output of the data buffer, and the trigger terminal is coupled to the strobe signal buffer to latch whichever of the high-bit and low-bit receiving data are not yet latched according to the data strobe signal;
  a second trigger latch, comprising a data input terminal, a trigger terminal and a data output terminal, wherein the data input terminal is coupled the data output terminal of the first negative enable latch, and trigger terminal is coupled to a second internal bus clock to output data of the data input terminal to the data output terminal synchronous to the second internal bus clock; and
  a second negative enable latch, comprising a data input terminal, a trigger terminal and a data output terminal, wherein the data input terminal is coupled the data output terminal of the first trigger latch, and trigger terminal is coupled to the second internal bus clock to output data of the data input terminal to the data output terminal synchronous to the second internal bus clock.

15. A method for transmitting data on a PCI bus, in a computer comprises a plurality of masters and a host bridge coupled to the PCI bus, said PCI bus having a plurality of bus request signals and a plurality of bus grant signals, the method comprising:

detecting whether individual master supports a dual transmission mode while starting up the computer;

asserting the corresponding bus request signal of individual master supporting the dual transmission mode; and judging whether the corresponding master corresponding to one of the bus request signals supports the dual transmission mode according to said corresponding bus request signal.

16. The method according to claim 15, further comprising:

outputting a dual mode ID when the dual transmission mode is required; and activating the dual transmission mode in response to the dual mode ID.

17. The method according to claim 15, wherein the detecting step comprises:

comparing a vendor's ID and a device ID of the individual master with a status list to determine whether the individual master supports the dual transmission mode.

18. The method according to claim 15, further comprising:

programming a host bridge in response to the masters supporting the dual transmission mode.

19. The method according to claim 16, wherein the dual mode ID is determined in response to two least significant bits of an address signal.

20. A method for transmitting data on a PCI bus, in a computer comprising a plurality of masters and a host bridge coupled to the PCI bus, said PCI bus having a plurality of bus request signals and a plurality of bus grant signals, the method comprising:

detecting whether individual master supports a dual transmission mode while starting up the computer;

asserting the corresponding bus request signal of individual master supporting the dual transmission mode;

judging whether the corresponding master corresponding to one of the bus request signals supports the dual transmission mode according to said corresponding bus request signal;

outputting a dual mode ID when the dual transmission mode is required; and activating the dual transmission mode in response to the dual mode ID, wherein the dual mode ID is determined in response to two least significant bits of an address signal, and said two least significant bits of the address signal are configured as 2.

21. A method for transmitting data on a PCI bus, in a computer comprising a plurality of masters and a host bridge coupled to the PCI bus, said PCI bus having a plurality of bus request signals and a plurality of bus grant signals, the method comprising:

detecting whether individual master supports a dual transmission mode while starting up the computer;

asserting the corresponding bus request signal of individual master supporting the dual transmission mode;

programming a host bridge in response to the masters supporting the dual transmission mode;

granting the PCI bus to one of the masters supporting the dual transmission mode;

asserting a dual mode ID by said master supporting the dual transmission mode; and performing a memory access at a dual speed while accessing in a range of a memory space supporting the dual transmission mode.

22. The method according to claim 21, further comprising:

performing a memory access at a normal speed while not accessing in the range of the memory space supporting the dual transmission mode.

* * * * *